(12) United States Patent
Tuyls et al.

(10) Patent No.: US 9,830,481 B2
(45) Date of Patent: Nov. 28, 2017

(54) TRANSPONDER SYSTEM FOR TRANSMITTING KEY-ENCRYPTED INFORMATION AND ASSOCIATED KEYS

(75) Inventors: Pim Tuyls, Mol (BE); Geert Jan Schrijen, Eindhoven (NL); Stefan Maubach, Nijmegen (NL); Boris Skoric, Den Bosch (NL); Antoon Marie Henrie Tombeur, Lommel (BE)

(73) Assignee: NXP B.V., Eindhoven (NL)

( * ) Notice: Subject to any disclaimer, the term of this patent is extended or adjusted under 35 U.S.C. 154(b) by 1133 days.

(21) Appl. No.: 11/917,041

(22) PCT Filed: Jun. 14, 2006

(86) PCT No.: PCT/IB2006/051904
§ 371 (c)(1),
(2), (4) Date: Dec. 10, 2007

(87) PCT Pub. No.: WO2006/134563
PCT Pub. Date: Dec. 21, 2006

(65) Prior Publication Data
US 2008/0199011 A1    Aug. 21, 2008

(30) Foreign Application Priority Data
Jun. 14, 2005   (EP) ..................................... 05105226

(51) Int. Cl.
*H04L 9/08*   (2006.01)
*G06K 7/00*   (2006.01)
(Continued)

(52) U.S. Cl.
CPC ....... *G06K 7/0008* (2013.01); *G06K 19/0723* (2013.01); *G06K 19/14* (2013.01)

(58) Field of Classification Search
CPC ..................................... H04L 9/08; G06F 7/58
(Continued)

(56) References Cited

U.S. PATENT DOCUMENTS 4,667,193 A * 5/1987 Cotie et al. ................. 340/10.32
4,725,841 A * 2/1988 Nysen et al. ................... 342/44
(Continued)

FOREIGN PATENT DOCUMENTS

EP   0114522 A2   8/1984
EP   0 727 752 A2   8/1996
(Continued)

OTHER PUBLICATIONS

Guha et al, Architecting a Secure Internet, ACM, Oct. 23, 2005, pp. 1-12.*

(Continued)

*Primary Examiner* — Bradley Holder
*Assistant Examiner* — Jenise Jackson

(57) ABSTRACT

A transponder (1) comprises at least one memory (MEM1, MEM2) for storing encrypted information (E_k(EPC, PI)) that has been encrypted by use of a key (k) and for storing the key (k) associated with the encrypted information (E_k (EPC, PI)). The transponder (1) is adapted to send the key (k) slower response than the encrypted information (E_k (EPC, PI)) in response to queries of a reading device (2), which is preferably done by delaying the transmission of the key (k) or by limiting the response rate at which the key (k) is transmitted. In particular the invention is related to RFID systems.

13 Claims, 4 Drawing Sheets

(51) Int. Cl.
*G06K 19/07* (2006.01)
*G06K 19/14* (2006.01)

(58) Field of Classification Search
USPC .............. 380/278; 726/9; 713/159, 193–194; 342/51
See application file for complete search history.

(56) References Cited

U.S. PATENT DOCUMENTS

| | | | | |
|---|---|---|---|---|
| 5,864,625 | A * | 1/1999 | Rutledge | H04L 9/0891 380/256 |
| 5,955,969 | A * | 9/1999 | D'Hont | 340/928 |
| 6,185,307 | B1 | 2/2001 | Johnson, Jr. | 380/270 |
| 6,201,474 | B1 | 3/2001 | Brady et al. | 340/572.8 |
| 6,332,572 | B1 * | 12/2001 | Yamamoto | B60R 25/2072 235/382 |
| 7,512,236 | B1 * | 3/2009 | Zhu | 380/255 |
| 9,177,325 | B2 * | 11/2015 | Lupoli | G08B 13/2462 |
| 2003/0128124 | A1 * | 7/2003 | Amtmann et al. | 340/592 |
| 2004/0054900 | A1 | 3/2004 | He | |
| 2004/0066278 | A1 * | 4/2004 | Hughes | G06F 21/31 340/10.1 |
| 2004/0160306 | A1 | 8/2004 | Stilp | |
| 2004/0179510 | A1 * | 9/2004 | Kuffner | G06K 7/0008 370/350 |
| 2004/0222878 | A1 * | 11/2004 | Juels | H04L 9/3273 340/10.1 |
| 2004/0223481 | A1 | 11/2004 | Juels et al. | |
| 2004/0263319 | A1 | 12/2004 | Huomo | |
| 2005/0036620 | A1 | 2/2005 | Casden et al. | |
| 2005/0177306 | A1 * | 8/2005 | Pearce et al. | 701/213 |
| 2005/0184150 | A1 * | 8/2005 | Welte et al. | 235/385 |
| 2006/0012473 | A1 * | 1/2006 | Bishop et al. | 340/539.1 |
| 2006/0059367 | A1 * | 3/2006 | Yarvis | G07C 9/00111 713/189 |
| 2006/0077034 | A1 * | 4/2006 | Hillier | G06Q 20/32 340/5.61 |
| 2006/0087407 | A1 * | 4/2006 | Stewart et al. | 340/10.52 |
| 2006/0117066 | A1 * | 6/2006 | Smith et al. | 707/104.1 |
| 2006/0176153 | A1 * | 8/2006 | Tang | G06K 19/0707 340/10.4 |
| 2006/0208066 | A1 * | 9/2006 | Finn | G06K 7/0004 235/380 |
| 2007/0011893 | A1 * | 1/2007 | Garber et al. | 33/286 |
| 2007/0016779 | A1 * | 1/2007 | Lyle | H04L 9/12 713/169 |
| 2007/0046432 | A1 * | 3/2007 | Aiouaz et al. | 340/10.1 |
| 2007/0132588 | A1 * | 6/2007 | Jung | G06K 19/0716 340/572.1 |
| 2007/0237332 | A1 * | 10/2007 | Lyle | H04L 9/12 380/263 |
| 2008/0001725 | A1 * | 1/2008 | White et al. | 340/10.51 |
| 2008/0034183 | A1 * | 2/2008 | Drago et al. | 711/219 |
| 2008/0034405 | A1 * | 2/2008 | McLean | G06F 12/1433 726/2 |
| 2008/0122610 | A1 * | 5/2008 | Muirhead | B65D 19/0016 340/505 |
| 2008/0148063 | A1 * | 6/2008 | Hanko | G06F 21/10 713/189 |
| 2010/0207739 | A1 * | 8/2010 | Smith et al. | 340/10.4 |

FOREIGN PATENT DOCUMENTS

| | | |
|---|---|---|
| WO | 2002103645 A2 | 12/2002 |
| WO | 2005008563 A2 | 1/2005 |

OTHER PUBLICATIONS

Bazakos et al, Fast Access Control Technology Solutions (FACTS), IEEE, 2005, pp. 312-317.*

Gupta et al, QOS Support in Mobile Ad-hoc Networks, 2000, IEEE, pp. 340-344.*

Karjoth, Disabling RFID Tags with Visible Confirmation: Clipped Tags are Silenced, 2005, ACM, pp. 27-30.*

Finkenzeller, K. "RFID-Handbuch: Grundlagen und praktische Anwendungen induktiver Funkanlagen, Transponder und kontaktloser Chipkarten: 8. Datensicherheit", RFID Handbook: Grundlagen Und Praktische Anwendungen, pp. 225-231 (2002).

Communication pursuant to Article 94(3) EPC for counterpart EP patent appln. 06765742.9 (Aug. 5, 2009).

Finkenzeller, K. "RFID-Handbuch: Grundlagen und praktische Anwendungen induktiver Funkanlagen, Transponder und kontaktloser Chipkarten: 8. Datensicherheit", RFID Handbook: Grundlagen Und Praktische Anwendungen, 14 pgs. (2002) with English Version.

* cited by examiner

TRANSPONDER SYSTEM FOR TRANSMITTING KEY-ENCRYPTED INFORMATION AND ASSOCIATED KEYS

FIELD OF THE INVENTION

The invention relates to a transponder comprising at least one memory for storing encrypted information that has been encrypted by use of a key and for storing the key associated with the encrypted information.

The invention further relates to a reading device which is adapted to send queries to said transponders.

The invention finally relates to a system of said transponder(s) and said reading device(s).

BACKGROUND OF THE INVENTION

Nowadays individual products are tagged with transponders or transponder chips which have various functions. For instance, in a shop they are used as ID tags or price tags to simplify the inventory, shipping/distribution process, while at home they may be used by various devices (refrigerator, washing machine) to electronically identify products or properties of products, respectively. As an example: a washing machine may warn the user, if she/he wants to wash clothing with a washing program which may damage the clothing.

One example of such a transponder is a so-called Radio Frequency Identification tag, or RFID tag for short. The terms RFID tag and transponder, as used herein, comprise data carriers containing information that can be read out by reading devices in a contactless manner. The information carried by the RFID tag comprises electronic product codes (EPC) but also product information, like the type of product, price, where it is supposed to go, etc. Further, RFID tags can also contain information for the user, like the washing temperature, handling process of the product, use/by date before which the product should be used, etc.

RFID tags are small, often bendable, tags. They normally consist of a small IC plus an antenna. The typical size of the IC is about 1 mm$^2$, while the antenna can be much larger. RFID tags generally have no power supply of their own (battery or similar), but respond to an electromagnetic field generated by a reading device. When being within such an electromagnetic field they gain electric power from this field, and are able to receive messages and give responses. However, the invention is not limited to passive transponders but also related to active transponders.

RFID tags are very widely used. Examples are: animal identification tags, access keys to doors, suitcase handling at airports, supply chain management, inventory management, etc. RFID tags are furthermore operable in various frequency ranges, reaching from low frequency up to the microwave band.

RFID tags are low-power devices, but nevertheless are gaining more and more capabilities. They are able to do calculations and may contain a working processor. An RFID tag may comprise several types of memory, like NV-RAM (non-volatile RAM) which is only active when electric power is present, a ROM part which can be written once and is thereafter unchangeable, an erasable ROM (EROM) which can be written and erased multiple times, etc.

Of course, it is most convenient and cost effective for a manufacturer (or a shop keeper) to put as many functions as possible in a single RFID tag. However, while the use of RFID tags is convenient and practical, it could be a bad thing if an RFID tag can be read out by unauthorized third parties, because this results in a violation of privacy. For example, detection of RFID tagged medicine for treating AIDS or impotence, "embarrassing" items, like sex articles, or expensive jewelry or other (less visible) valuable items (marking the wearer as target for robberies) could be awkward or even dangerous for the affected persons, if such information falls into the wrong hands.

Generally, an RFID tag will send out a fixed message which is stored in some type of memory, which takes no calculation time for preparing the message. The fixed messages may contain plain character strings and/or statically encrypted strings. However, when a tag sends out the exact same message all the time, then security problems with linkability and tracking arise, regardless of whether this message is encrypted or not. In this document "linkability" is a term used to describe that a transponder (and the product to which it is fixed) is assignable to a specific person, when the transponder transmits the same message all the time. Even though the RFID tag does not transmit directly person-related information like "I am owned by Alice", an attacker can recognize Alice by this RFID tag transmitting the same message every time, once he finds an instance enabling him to assign ("link") this message to Alice. Linkability can be hindered by semantically secure encryption of the messages transmitted by the RFID tag, requiring that the re-encryption has to be carried out every time when the message is read out. "Tracking" is the term used for exactly this: Alice is linked to a transponder and can be tracked by an attacker by following the transponder. Tracking may even be possible when semantically secure encryption is used, but the key used for it has leaked.

In order to overcome these privacy problems inherent in RFID tags several approaches are conceivable:

The RFID tag is destroyed or disabled or removed from the product once it has fulfilled its inventory task or the like in a shop or warehouse, etc. This approach has the disadvantage that the RFID tag is no longer useable for later applications, like in-home use.

The message transmission speed of the RFID is set to be so low that an unauthorized reader has not enough time and means to read the tag en passant (when passing by). This is undesirable, as authorized readers want to be able to read the tag rapidly.

Document US 2004/0222878 A1 describes the use of cryptographic techniques having a complexity level which permits their implementation in an inexpensive RFID tag. In an RFID system comprising one or more transponders and at least one reader that communicates with the devices, a plurality of pseudonyms is associated with a given one of the transponders. The transponder transmits different ones of the pseudonyms in response to different reader queries, and an authorized verifier is able to determine that the different transmitted pseudonyms are associated with the same transponder. For additional security it is proposed in this document to impose a low query response rate within the transponder, which may be accomplished by implementing hardware-based response delays within the transponder. In another example it is suggested to specify a maximum rate at which the transponder is permitted to respond to reader queries with transmitted pseudonyms.

The known transponder systems, however, suffer from the disadvantage that when the suggested query response throttling measures are implemented within the transponders transmitting the pseudonyms from the transponders to the readers will always be accomplished at reduced response rates and will thereby limit the applicability of the transponder system to low-speed applications. A further disadvantage of the known transponder system is that keeping track of all the pseudonyms requires a lot of administration.

OBJECT AND SUMMARY OF THE INVENTION

It is an object of the invention to provide a transponder of the type defined in the opening paragraph, a reading device of the type defined in the second paragraph and a system of the type defined in the third paragraph, in which the disadvantages discussed above are avoided.

In order to achieve the object defined above, with a transponder according to the invention, characteristic features are provided so that a transponder according to the invention can be characterized in the way defined below, that is:

A transponder comprising at least one memory for storing encrypted information that has been encrypted by use of a key and for storing the key associated with the encrypted information, wherein the transponder is adapted to send the key slower than the encrypted information in response to queries of a reading device.

In order to achieve the object defined above, with a reading device according to the invention, characteristic features are provided so that a reading device according to the invention can be characterized in the way defined below, that is:

A reading device adapted to send queries to transponders requesting encrypted information and a key associated with the encrypted information, wherein the reading device comprises decryption means to decrypt the encrypted information by use of the key.

In order to achieve the object defined above, an inventive system finally comprises at least one reading device and transponders with the features according to the present invention.

It should be noted at this point that a "reading device" as used herein is normally not only provided for reading data from a transponder, but also provided for transmitting data to a transponder. When talking about RFID systems, a reading device is often referred to as a "reader" for short.

The characteristic features according to the invention provide the advantage that the privacy problems inherent in transponders or RFID tags respectively can at least considerably be reduced by transmitting key-encrypted information via a fast route from the transponder to the reading device and transmitting the associated key necessary to decrypt the key-encrypted information via a slow route from the transponder to the reading device. While these measures successfully hinder an eavesdropper who passes by transponders to read out the stored information, they do not noticeable reduce the processing speed of the transponder system and are therefore applicable to a wide range of transponder applications or in particular RFID applications respectively. It should be observed that the key-encrypted information, which is transmitted in the fast mode, is usually much longer than the key, which is transmitted in the slow mode. The difference in the response rate between transmitting the encrypted information and the key can be fully customized for any application. In preferred embodiments of the invention the encrypted information is transmitted with full processing speed, while the response rate for transmitting the key is restricted by one or more of the following measures implemented in the transponder:

a) Key delay means are inserted into the route between the memory containing the key and transmitting means. The way in which the actual delay occurs in the transponder can be customized for any application. One may put delay before any message is transmitted from the transponder (after which the encrypted information is transmitted as fast as possible), but delay can be put in between parts of the message, like between every bit of information. Delay can be variable depending on circumstances.

b) Response rate limiting means are inserted into the route between the memory containing the key and transmitting means. The response rate limiting means differ from the key delay means in that they actually throttle the bit rate of data transmission from the memory to the transmitting means, whereas the key delay means delay the start of transmission of the data read out from the memory or interrupt transmitting the data, but in general let the data pass with full bit rate.

c) The encrypted information is stored in a fast-responding memory, while the key is stored in a slow-responding memory.

The key delay means and the response rate limiting means can be implemented by hardware circuits, like timers or counters, but they can also be implemented by software, for instance by processing instruction loops. Generally speaking, delay and response rate limiting can be implemented as a side effect of computation time, which may be adapted to take the required time.

When the transponder is provided with a random number generator for generating random numbers and encrypting means for computing randomized encrypted information, preferably semantically secure encrypted information from the encrypted or unencrypted information and a random number, linking and tracking can be successfully prevented. Semantically secure encryption, as used herein, is encryption which in practice adds a random component: with every encryption of a message m using key k a random string r is generated, and encryption actually is a function F using k, r to encrypt m, $F_{k,r}(m)$ for short. So $E\_k(m)$ is not uniquely determined but contains a random factor. However, when knowing k (but not knowing r!) it is nevertheless possible to decrypt $E\_k(m)$. A very instructive example for semantically secure encryption is ElGamal encryption, a public key encryption system: a chosen number g, the secret key s, the public key h:=g XOR s ('XOR' is the symbol for Exclusive-OR operation), the message m, and the randomness r are numbers in a finite field F. Encryption is $m \rightarrow (g^r, h^r\,m)$. When one knows s and receives a message (a, b) then decryption is computing b divided by a XOR s. Any time the message m is encrypted, the random variable r is different. If one does not know the secret key s then one cannot differentiate between messages $(g^r, h^r\,m)$ for some random r and (a, b) where both a and b are random. So in short, semantically secure encryption needs computation time any time the encrypted value should be sent, since the encryption should be recalculated using a different randomness.

In another embodiment of the transponder according to the invention unencrypted information is stored in a blockable memory. The term "blockable memory" is to be understood in the sense that either the memory itself is destroyed or disabled, or the data route from the memory is interrupted. When these features are implemented the transponder system can be operated in different modes. For instance, distribution or shop-inventory-management which are supposed to take place in a secure environment can be carried out in a fast mode by querying the unencrypted information, while when being sold or shipped the memory of the transponder containing unencrypted information is blocked so that for future use only the encrypted information can be read out (in fast mode).

In another embodiment of the present transponder system using transponders with blockable memories containing unencrypted information, the transponder having said memory blocked will only respond to queries of the reading device if the reading device sends a message with the correct key, that has e.g. previously been transmitted from the transponder to the reading device. However, this embodiment of the invention is still vulnerable to eavesdropping, since the key can freely be heard. In order to close this potential security hole in yet another embodiment of the invention a challenge-response protocol is used. The transponder comprising a random number generator and challenge generating means generates and sends to the reading device a challenge that includes a random number. The reading device, in turn, sends a message back to the transponder, derived from the challenge and the key. The transponder comprises message analyzing means being adapted to analyze whether a message received from the reading device actually is derived from the random number previously sent within the challenge and the key, and when these conditions are met, initiates the encrypted information to be read out from the memory.

In a further embodiment of the invention, which provides high processing speed at the shop combined with good security, the reading device cooperates with a data base wherein pairs of encrypted information and associated keys are stored, or wherein pairs of encrypted information and associated unencrypted information are stored. The reading device is adapted, when receiving encrypted information from a transponder, to retrieve the associated key or the associated unencrypted information from the database. When retrieving the associated key the encrypted information can be decrypted by use of the key.

The aspects defined above and further aspects of the invention are apparent from the exemplary embodiments to be described hereinafter and are explained with reference to these exemplary embodiments.

BRIEF DESCRIPTION OF THE DRAWINGS

The invention will be described in more detail hereinafter with reference to exemplary embodiments. However, the invention is not limited to these exemplary embodiments.

DESCRIPTION OF EMBODIMENTS

Figure 1:
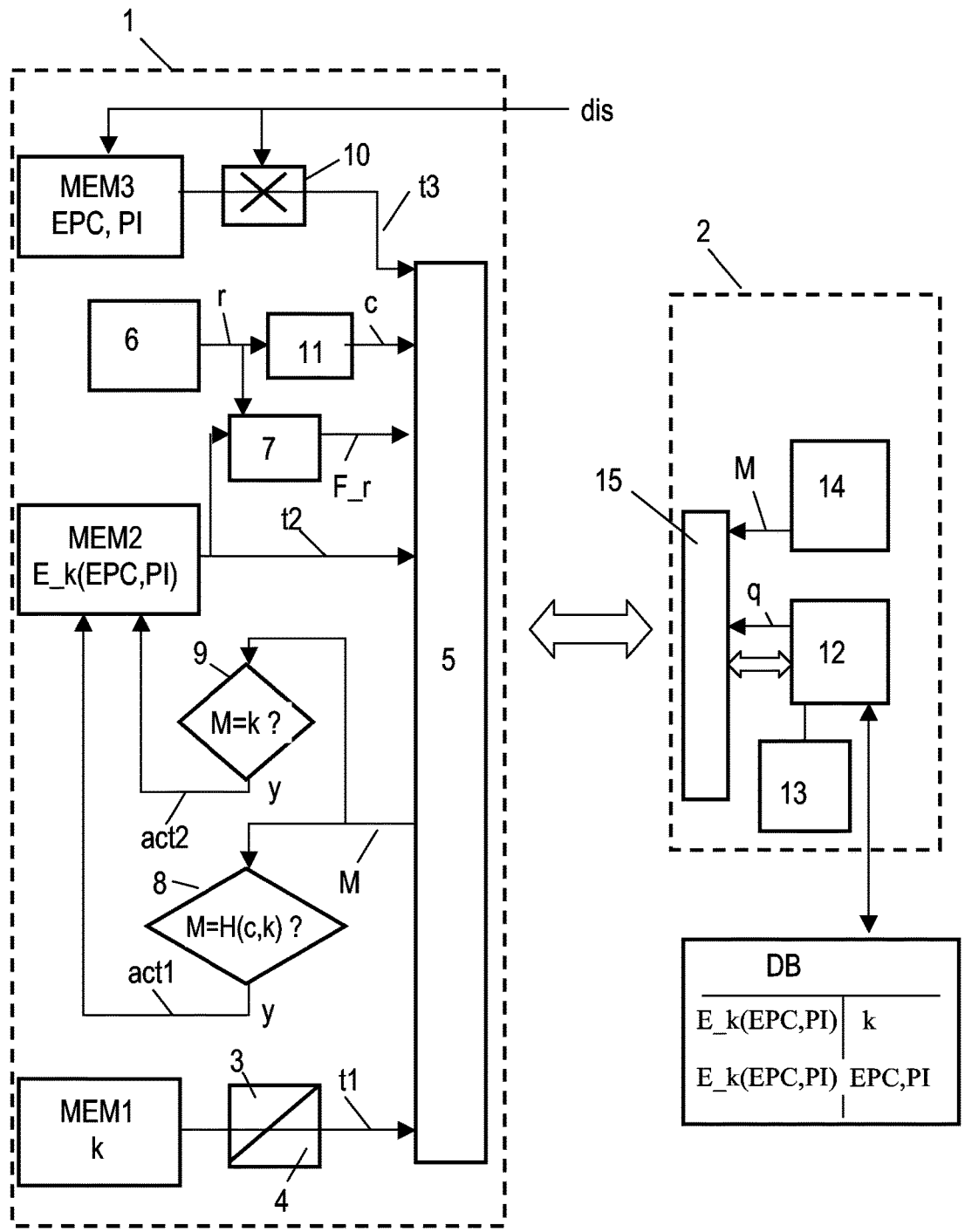
FIG. 1 shows in a block diagram an embodiment of an inventive transponder system.

FIG. 1 shows in a block diagram an embodiment of the transponder system according to the present invention. The system according to the invention comprises transponders 1 (only one is depicted in FIG. 1) and a reading device 2. It should be noted that the transponder 1 and the reading device 2 illustrated in FIG. 1 contain several options and alternatives which normally will not be incorporated within one single device, but have been incorporated in the drawing for better illustration.

The transponder 1, which for instance could be configured as an RFID tag, comprises a first memory MEM1 for storing a key k and a second memory MEM2 for storing encrypted information E_k(EPC, PI) that has been encrypted by use of the key k. Both memories MEM1, MEM2 can be configured as ROMs. It should be observed that the memories MEM1, MEM2 can also be configured as different parts of one physical ROM device. As an alternative, the encrypted information E_k(EPC, PI) can be stored in a fast-responding second memory MEM2 and the key k can be stored in a slow-responding first memory MEM1. The information mentioned above contains an electronic product code EPC, i.e. a code or number which identifies each object uniquely, and additional product information PI describing the product or its properties.

According to the invention it is essential that the key k is transmitted slower to the reading device 2 than the encrypted information E_k(EPC, PI) in response to queries of the reading device 2. This may be accomplished—as has been mentioned above—by storing the key k and the encrypted information E_k(EPC, PI) in different types of memories having different response rates. As an alternative key delay means 3 and/or response rate limiting means 4 are switched into a first route t1 from first memory MEM1 to a transceiver 5 of the transponder 1, so that the first route t1 becomes a slowly responding route, whereas the encrypted information E_k(EPC, PI) is directly passed from second memory MEM2 to the transceiver 5 via a second route t2. The key delay means 3 and/or response rate limiting means 4 may be hardware- or software-implemented.

In order to implement randomized encryption, and particularly semantically secure encryption, the transponder 1 comprises a random number generator 6 for generating random numbers r (or pseudo-random numbers) and encrypting means 7 for computing semantically secure encrypted information F_r(E_k(EPC, PI)), in the drawing abbreviated as F_r, from the encrypted information E_k(EPC, PI) and a random number r. The encrypting means 7 may for instance work according to the above explained ElGamal encryption.

It should be observed that optionally the fast-responding second memory MEM2 can contain the unencrypted information EPC, PI and the key k, rather than the encrypted information E_k(EPC, PI). Randomized encryption is implemented by feeding the unencrypted information EPC, PI, the key k and a random number r to the encrypting means 7, which outputs a randomized encryption of information EPC, PI, wherein key k has been used for encryption. The drawback of this solution is of course that the information EPC, PI is stored in plain text in the fast-responding second memory MEM2, but in order to read out the fast-responding second memory MEM2 an attacker would have to get hold of the transponder 1 and even in such a case fast-responding second memory MEM2 cannot directly be read out.

Further, the transponder 1 comprises a third memory MEM3 in which unencrypted information EPC, PI is stored. The third memory MEM3 is advantageously configured as an erasable ROM (EROM) allowing for erasing its contents prior to shipping the transponder 1 to insecure environments. Generally speaking, it is essential that the third memory MEM3 can be blocked, so that its content may not any longer be read out from the transponder 1. In order to achieve this the third memory MEM3 may be erased, as explained above, or disabled or even destroyed. As an alternative a one-time switch 10 can be switched into the third route t3 between the third memory MEM3 and the transceiver 5. The one-time switch 10 is configured to interrupt the third route t3 under the control of a control signal dis that is generated externally of the transponder 1. A control signal dis may also be used to disable/erase the third memory MEM3. The third memory MEM3 can also be configured in a way so that it can be switched from a blocked state to a de-blocked state. De-blocking can e.g. be achieved by a second irreversible action, for instance by activating a by-pass to one-time switch 10.

The transponder 1 also comprises comparing means 9 being adapted to compare a message M received from the reading device 2 with the key k. If the message M corresponds to the key k the comparing means 9 sends an activation signal act2 to the second memory MEM2, thereby initiating the encrypted information E_k(EPC, PI) to be read out from the second memory MEM2. A more detailed explanation of this operation mode is given below.

The transponder 1 further comprises challenge generating means 11 for generating and sending to the reading device 2 a challenge c that includes a random number r generated by the random number generator 6, and message analyzing means 8 being adapted to analyze whether a message M received from the reading device 2 is derived from the random number r previously sent with the challenge c and from the key k which has also previously been sent to the reading device 2 in a low-speed mode. When the analyzed message M is correct, the message analyzing means 8 sends an activation signal act1 to the second memory MEM2, thereby initiating the encrypted information E_k(EPC, PI) to be read out from the second memory MEM2. A more detailed explanation of this operation mode is given below.

It should be observed that the random number generator 6, challenge generating means 11, message analyzing means 8, and comparing means 9 can be software implemented by using a working processor within the transponder 1.

The reading device 2 comprises a transceiver 15 for wireless communication with the transponder 1 and a controller 12 carrying out various control and computational functions within the reading device 2. For instance, the controller 12 initiates queries q to be sent to the transponders 1 requesting them to transmit their encrypted information E_k(EPC, PI) and keys k associated to the encrypted information E_k(EPC, PI). The reading device 2 further comprises decryption means 13 to decrypt the received encrypted information E_k(EPC, PI) by use of the received keys k. The reading device 2 may also cooperate with a database DB which is adapted to store pairs of encrypted information E_k(EPC, PI) and associated keys k, and a message generator 14 being adapted to generate messages M that are either derived from a key k previously received from the transponder 1 or derived from a key k and a challenge c both previously having been received from the transponder 1. A more detailed explanation of the operation of reading device 2 is given below.

Now several operation modes of the present transponder system comprising transponders 1 and reading devices 2 are explained with the help of various scenarios. The scenarios are based on typical shop applications, wherein the information stored in the transponder 1 should also be readable in a limited way at home, but it should be noted that the invention is not restricted to these applications.

Figure 2:
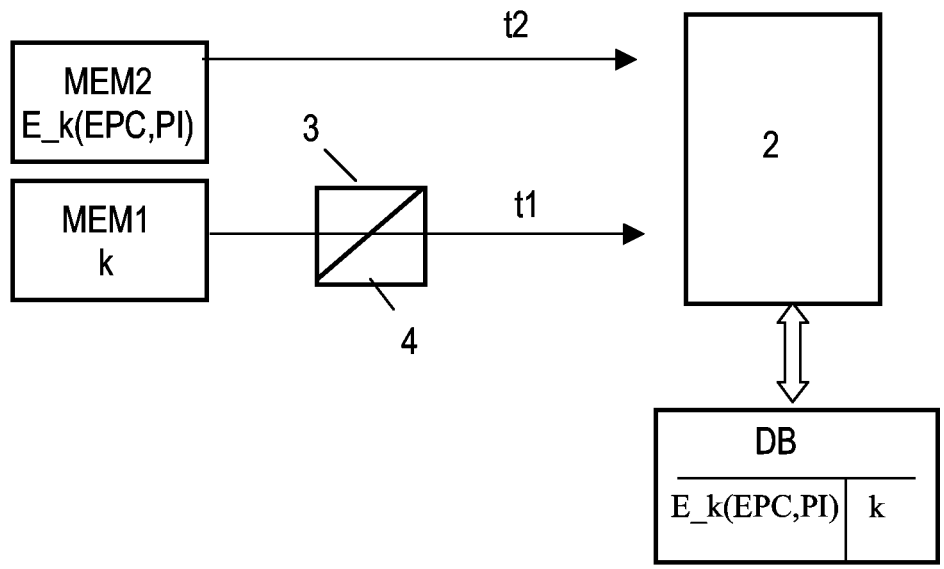
FIG. 2 shows in a block diagram a first scenario how an inventive transponder system can be operated.

FIG. 2 schematically shows a first scenario of how the transponder system according to the present invention can be operated. The transponder 1 comprises the first memory MEM1 which holds the encryption key k in a slowly readable first route t1. It further comprises the second memory MEM2 which holds the information EPC, PI in a key-encrypted form E_k(EPC,PI). The second memory MEM2 is connected to the fast readable second route t2.

Protocol in shop: The shop will know (or take the time to read in a secure environment by reading device 2) the key k which is read out from transponder 1 via the slowly readable first route t1, or in other words, via the first route t1 with a low response rate. Further, the reading device 2 in the shop queries the encrypted information E_k(EPC,PI) from the transponder 1 via the fast second route t2. In the database DB pairs (E_k(EPC,PI), k) are stored, so that it is possible to retrieve for any encrypted information E_k(EPC,PI) received by the reading device 2 the associated key k from the database DB and then to decrypt the information EPC,PI. In the shop the transponder 1 can thus be read out quickly. When sold, the shop erases (E_k(EPC,PI), k) from its database DB (or at least flags it as being sold). Alternatively, pairs (E_k(EPC,PI), EPC, PI) are stored in the database DB, so that it is possible to retrieve for any encrypted information E_k(EPC,PI) received by the reading device 2 the associated unencrypted information EPC, PI from the database DB.

Protocol at home: A reading device 2 incorporated in a device like a washing machine takes the time to read out the key k from transponder 1 via its slowly readable first route t1. Knowing key k, the encrypted information (E_k(EPC, PI),k), which can be read from the transponder 1 via the fast readable second route t2, can be decrypted. The device at home may store the key k or read it out at every use. The device may store pairs (E_k(EPC,PI),k) in a database, if necessary.

Advantages: The shop as well as the user can read out the transponder 1 rapidly.

Disadvantages: The shop (and perhaps the user at home) has to keep a database of pairs of elements (E_k(EPC,PI),k).

Vulnerabilities: The transponder 1 is vulnerable to linkability and tracking, as it is always readable fast and sends out a unique string E_k(EPC,PI).

Figure 3:
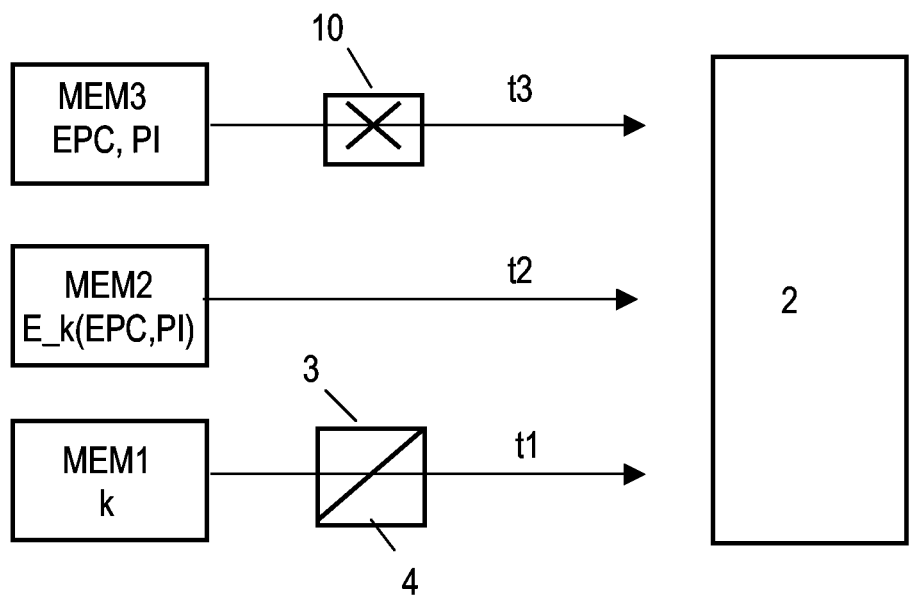
FIG. 3 shows in a block diagram a second scenario how an inventive transponder system can be operated.

FIG. 3 schematically shows a second scenario of how the transponder system according to the present invention can be operated. The transponder 1 comprises the first memory MEM1 which holds the encryption key k in a slowly readable first route t1. The transponder 1 further comprises the second memory MEM2 which holds the information EPC, PI in a key-encrypted form E_k(EPC,PI). The second memory MEM2 is connected to the fast readable second route t2. It further comprises a third memory MEM3 which contains the information EPC, PI in unencrypted form in a fast readable third route t3.

Protocol in shop: The fast third route t3 is used to read out the unencrypted information EPC, PI quickly. When sold, the fast third route t3 has to be destroyed or blocked (for example by erasing memory MEM3 or by activating one-time switch 10).

Protocol at home: A reading device 2 incorporated in a device like a washing machine takes the time to read out the key k from transponder 1 via its slowly readable first route t1. Knowing the key k, the encrypted information E_k(EPC, PI), which can be read from the transponder 1 via the fast readable second route t2, can be decrypted. The device at home may store the key k or read it out at every use. The device may store pairs (E_k(EPC,PI),k) in a database, if necessary.

Advantages: The shop as well as the user can read out the transponder 1 rapidly.

Disadvantages: Perhaps the user at home has to keep a database of pairs of elements (E_k(EPC,PI),k).

Vulnerabilities: The transponder 1 is vulnerable to linkability and tracking, as it is always readable fast and sends out a unique string E_k(EPC,PI).

Figure 4:
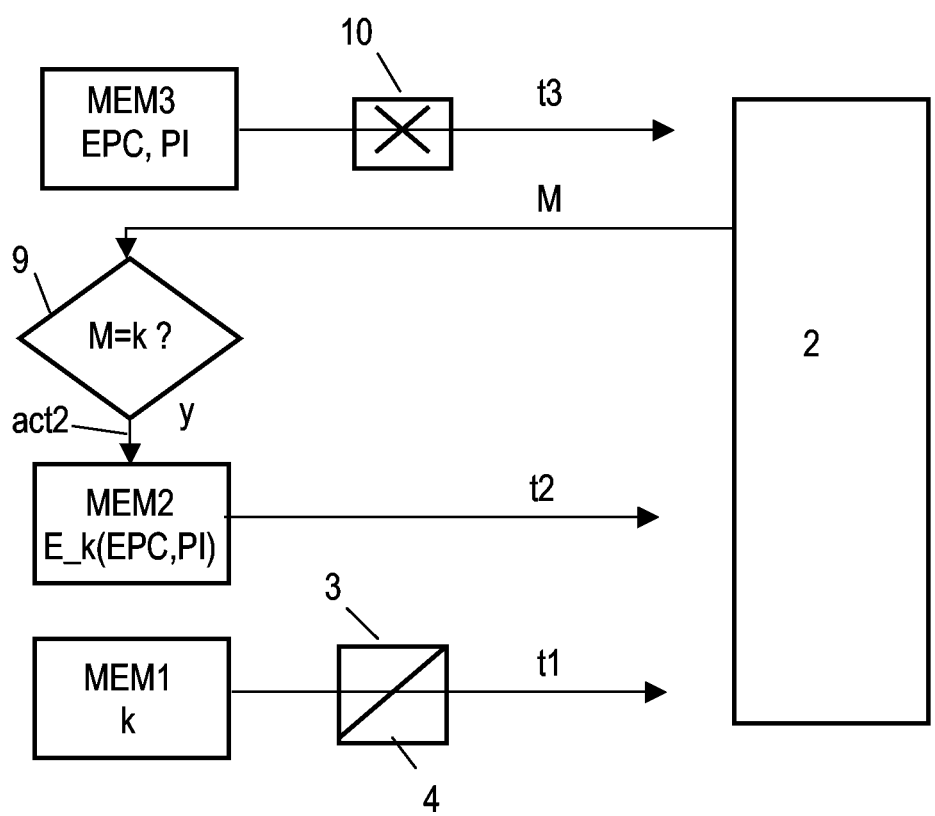
FIG. 4 shows in a block diagram a third scenario how an inventive transponder system can be operated.

FIG. 4 schematically shows a third scenario of how the transponder system according to the present invention can be operated. The transponder 1 comprises the first memory MEM1 which holds the encryption key k in a slowly readable first route t1. It further comprises the second memory MEM2 which holds the information EPC, PI in a key-encrypted form E_k(EPC,PI). The second memory MEM2 is connected to the fast readable second route t2 and requires an authentication key k to be sent to it to become active. It further comprises a third memory MEM3 which contains the information EPC, PI in unencrypted form in a fast readable third route t3.

Protocol in shop: The fast third route t3 is used to read out the unencrypted information EPC, PI quickly. When sold, the fast third route t3 has to be destroyed or blocked (for example by erasing memory MEM3 or by activating one-time switch 10).

Protocol at home: A reading device 2 incorporated in a device like a washing machine takes the time to read out the key k from transponder 1 via its slowly readable first route t1. Knowing key k, the reading device 2 generates a message M containing key k and sends it to the transponder 1. Transponder 1 compares by comparing means 9 whether the key k in message M is correct and will only respond by sending the encrypted information E_k(EPC,PI) via the fast readable second route t2, if the key k is correct. The encrypted information E_k(EPC,PI) can be decrypted by the reading device 2 by use of the key k. The device at home may store the key k in a key database or read it out at every use.

Advantages: Transponder 1 is fast readable in shop and at home. After sale, transponder 1 will only respond if it receives a message M with a correct key k.

Vulnerabilities: An eavesdropper can freely hear key k and can use it to decrypt encrypted information (E_k(EPC, PI)), activate the transponder 1, etc. Thus, the transponder 1 becomes subject to tracking.

Figure 5:
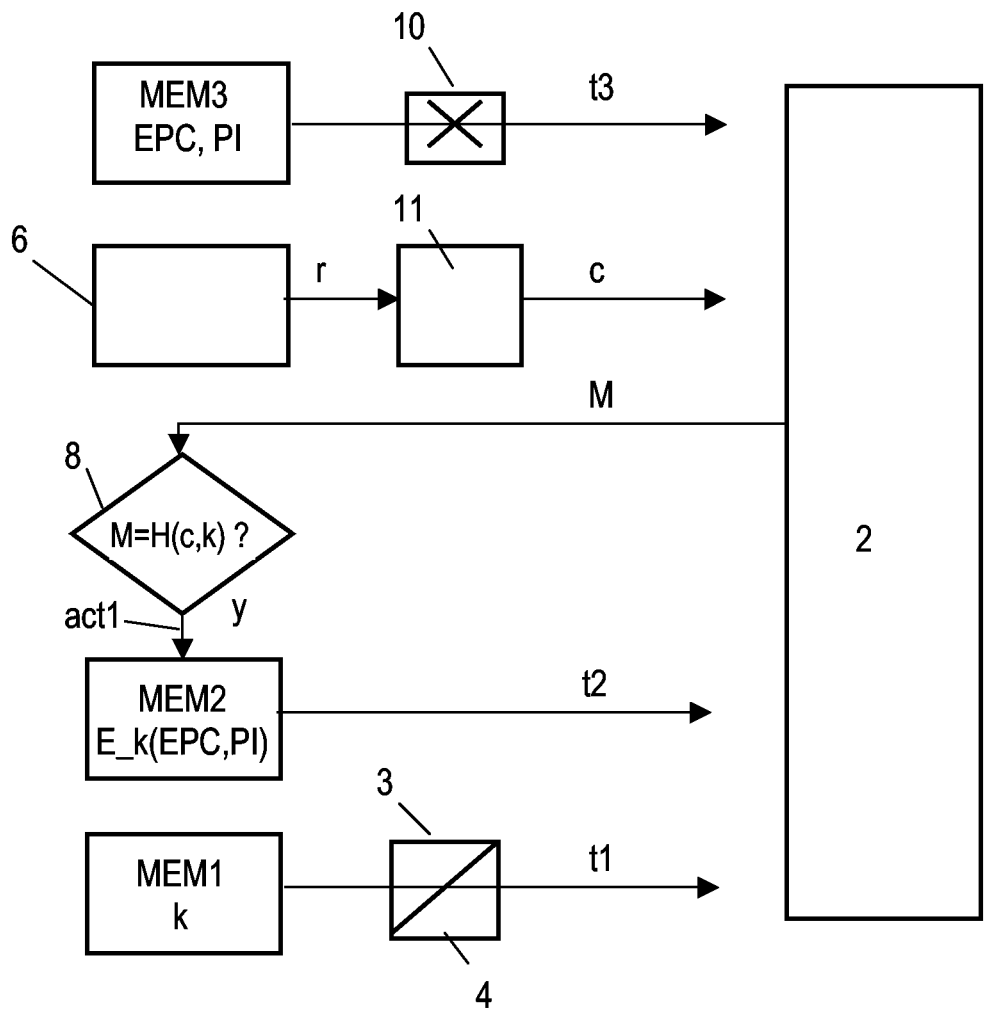
FIG. 5 shows in a block diagram a fourth scenario how an inventive transponder system can be operated.

FIG. 5 schematically shows a fourth scenario of how the transponder system according to the present invention can be operated. In this scenario use is made of the random number generator 6 within the transponder 1. The transponder 1 comprises the first memory MEM1 which holds the encryption key k in a slowly readable first route t1. It further comprises the second memory MEM2 which holds the information EPC, PI in a key-encrypted form E_k(EPC,PI). The second memory MEM2 is connected to the fast readable second route t2. A challenge-response protocol is used to check if the reading device 2 is authorized to query the encrypted information E_k(EPC,PI) stored in the second memory MEM2. It further comprises a third memory MEM3 which contains the information EPC, PI in unencrypted form in a fast readable third route t3.

Protocol in shop: The fast third route t3 is used to read out the unencrypted information EPC, PI quickly. When sold, the fast third route t3 has to be destroyed or blocked (for example by erasing memory MEM3 or by activating one-time switch 10).

Protocol at home: A reading device 2 incorporated in a device like a washing machine takes the time to read out the key k from transponder 1 via its slowly readable first route t1. Thereupon, the transponder 1 sends a random challenge c. In response to the challenge c the reading device computes a hash of challenge c and key k:H(c, k) and sends a message M with this hash to the transponder 1. The transponder 1 also computes the hash H(c, k) and checks by means of message analyzing means 8, if this hash corresponds to that sent by the reading device 2 within message M. If the hashes are not identical, the transponder 1 keeps silent. If the hashes are identical, the transponder 1 sends out the encrypted information E_k(EPC,PI) via its fast second route t2. The reading device 2 decrypts the received encrypted information E_k(EPC,PI).

Advantages: Since the key k is not transmitted from the reading device 2 to the transponder 1, eavesdroppers can hardly gain access to the transponder 1. The fact that in this embodiment of the invention the key k is transmitted from the transponder 1 to the reading device 2 is regarded as a minor potential problem, since eavesdropping of the transmission channel from the transponder 1 to the reading device 2 is much more difficult than of the transmission channel from the reading device 2 to the transponder 1.

It should be observed that the problem underlying the present invention can also be solved by the following configuration. A transponder has an electronic product code EPC together with product information PI stored in an erasable, rapidly accessible EROM and also in a ROM with a delay circuit.

Protocol in shop: In the shop the EROM will be used and thus the electronic product code EPC and the product information PI can be read out rapidly. When sold, the EROM is erased or destroyed.

Protocol at home: The transponder is only slowly readable through the delay circuit in the ROM.

Advantage: In the shop the transponder can be read out rapidly. When sold, the transponder is very hard to track, thus providing a solution to the linkability/tracking problem.

Disadvantage: The transponder is always slow at home.

Vulnerabilities: When the transponder is stationary for too long, it is freely readable by a patient adversary.

It should be noted that the invention is not limited to a shop and a home environment as shown in the above examples. The roles of the shop and the home may rather be exchanged on the one hand or changed to another person or institution respectively on the other.

It finally should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The words "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A radio frequency identification (RFID) transponder comprising:
  at least one memory that is configured to store both encrypted information that has been encrypted by use of a key and the key necessary to decrypt the stored encrypted information; and
  a transmitter that is configured to separately transmit, in response to queries of a reading device, the stored key by a slowly readable route and the stored encrypted information by a first fast readable route, wherein the slowly readable route and the first fast readable route are different routes, with data transmitted over the slowly readable route having a lower transmission speed than data transmitted over the first fast readable route, and send unencrypted information via a second fast readable route, separate from the first fast readable route for the stored encrypted information, with data transmitted over the slowly readable route having a lower transmission speed than data transmitted over the second fast readable route, with all transmitted data, the stored key, the stored encryption information, and the unencrypted information transmitted from the transponder to the reading device;

a random number generator that is configured to generate random numbers; and an encryptor that is configured to compute randomized encrypted information utilizing the generated random numbers, wherein with every encryption of a message M using key K, a random string R is generated, and the encryption is a function F using K and R to encrypt M.

2. The transponder as claimed in claim 1, further comprising:

a key delayer that is configured to pass the stored key in a time-delayed manner to the transmitter.

3. The transponder as claimed in claim 1, further comprising:

a response rate limiter that is configured to limit a response rate at which the stored key is passed to the transmitter.

4. The transponder as claimed in claim 1, wherein a blockable memory is configured to store unencrypted information.

5. The transponder as claimed in claim 1, further comprising:

a comparator that is configured to compare a message received from the reading device with the stored key, and, if the message corresponds to the stored key, initiate the encrypted information to be read out from the at least one memory.

6. The transponder as claimed in claim 1, further comprising:

a random number generator that is configured to generate a random number;

a challenge generator that is configured to generate and send to the reading device a challenge that includes the generated random number; and a message analyzer that is configured to analyze whether a message received from the reading device is derived from the generated random number previously sent with the challenge and from the stored key, and if so, initiate the stored encrypted information to be read out from the at least one memory.

7. The transponder as claimed in claim 2, wherein the key delayer is configured to insert delay between every bit of information.

8. The transponder as claimed in claim 3, wherein the response rate limiter is configured to throttle a bit rate of data transmission from the at least one memory to the transmitter.

9. The transponder as claimed in claim 1, wherein a random variable is different each time a message is encrypted by the key.

10. The transponder as claimed in claim 4, wherein the blockable memory is configured to be switched to a de-blocked state.

11. The transponder as claimed in claim 1, wherein the slowly readable route comprises both a key delayer and a response rate limiter.

12. An encryption method in a radio frequency identification (RFID) transponder comprising at least one memory, a transmitter, a random number generator, and an encryptor, the encryption method comprising:

storing, with the at least one memory, both encrypted information that has been encrypted by use of a key and the key necessary to decrypt the stored encrypted information;

transmitting, with the transmitter, in response to queries of a reading device, the stored key by a slowly readable route and the stored encrypted information by a first fast readable route, wherein the slowly readable route and the first fast readable route are different routes, with data transmitted over the slowly readable route having a lower transmission speed than data transmitted over the first fast readable route;

transmitting, with the transmitter, unencrypted information via a second fast readable route, separate from the first fast readable route for the stored encrypted information, with data transmitted over the slowly readable route having a lower transmission speed than data transmitted over the second fast readable route, with all transmitted data, the stored key, the stored encryption information, and the unencrypted information transmitted from the transponder to the reading device;

generating, with the random number generator, random numbers; and computing, with the encryptor, randomized encrypted information utilizing the generated random numbers, wherein with every encryption of a message M using key K, a random string R is generated, and the encryption is a function F using K and R to encrypt M.

13. A non-transitory medium, which, when instructions embodied upon the non-transitory medium are executed by a processor causes the processor to perform encryption, the non-transitory medium comprising:

instructions for storing, with a memory, both encrypted information that has been encrypted by use of a key and the key necessary to decrypt the stored encrypted information;

instructions for transmitting, with a transmitter, in response to queries of a reading device, the stored key by a slowly readable route and the stored encrypted information by a first fast readable route, wherein the slowly readable route and the first fast readable route are different routes, with data transmitted over the slowly readable route having a lower transmission speed than data transmitted over the first fast readable route;

instructions for transmitting, with the transmitter, unencrypted information via a second fast readable route, separate from the first fast readable route for the stored encrypted information, with data transmitted over the slowly readable route having a lower transmission speed than data transmitted over the second fast readable route, with all transmitted data, the stored key, the stored encryption information, and the unencrypted information transmitted from the transponder to the reading device;

instructions for generating, with a random number generator, random numbers; and instructions for computing, with an encryptor, randomized encrypted information utilizing the generated random numbers, wherein with every encryption of a message M using key K, a random string R is generated, and the encryption is a function F using K and R to encrypt M.

* * * * *